(12) United States Patent
Kwon et al.

(10) Patent No.: US 10,862,615 B2
(45) Date of Patent: Dec. 8, 2020

(54) MODULATION AND CODING SCHEME SELECTION FOR MASSIVE MULTIPLE-INPUT MULTIPLE-OUTPUT (MIMO) SYSTEMS WITH PARTIAL CHANNEL INFORMATION

(71) Applicant: Samsung Electronics Co., Ltd., Gyeonggi-do (KR)

(72) Inventors: Hyukjoon Kwon, San Diego, CA (US); Jungwon Lee, San Diego, CA (US); Farrokh Etezadi, San Diego, CA (US); Kee-Bong Song, San Diego, CA (US)

(73) Assignee: Samsung Electronics Co., Ltd

( * ) Notice: Subject to any disclaimer, the term of this patent is extended or adjusted under 35 U.S.C. 154(b) by 51 days.

(21) Appl. No.: 16/252,004

(22) Filed: Jan. 18, 2019

(65) Prior Publication Data

US 2020/0153537 A1    May 14, 2020

Related U.S. Application Data

(60) Provisional application No. 62/758,204, filed on Nov. 9, 2018.

(51) Int. Cl.
| | | |
|---|---|---|
| *H04L 1/00* | (2006.01) | |
| *H04L 25/02* | (2006.01) | |
| *H04L 5/00* | (2006.01) | |
| *H04B 7/06* | (2006.01) | |

(Continued)

(52) U.S. Cl.
CPC ......... *H04L 1/0003* (2013.01); *H04B 7/0617* (2013.01); *H04B 7/0632* (2013.01); *H04B 17/336* (2015.01); *H04L 5/0048* (2013.01); *H04L 25/0226* (2013.01); *H04B 7/0413* (2013.01)

(58) Field of Classification Search
CPC . H04L 1/0003; H04L 25/0226; H04L 5/0048; H04B 7/0617; H04B 7/0632; H04B 17/336; H04B 7/0413
See application file for complete search history.

(56) References Cited

U.S. PATENT DOCUMENTS

| | | |
|---|---|---|
| 8,463,191 B2 | 6/2013 | Farajidana et al. |
| 9,843,423 B2 | 12/2017 | Kang et al. |

(Continued)

OTHER PUBLICATIONS

Baek, Jung-Yeon et al., A Study on Channel Estimation Algorithm with Sounding Reference Signal for TDD Downlink Scheduling, Copyright 2017 IEEE, . . . IEEE 28th Annual International Symposium on Personal, Indoor, and Mobile Radio Communications (PIMRC), Montreal, Canada, Oct. 8-13, 2017, pp. 6.

(Continued)

*Primary Examiner* — Thai Nguyen
(74) *Attorney, Agent, or Firm* — The Farrell Law Firm, P.C.

(57) ABSTRACT

A method and system are herein disclosed. The method includes receiving sounding reference signals (SRS) at a massive multiple-input multiple-output (MIMO) base station (BS) from a user equipment (UE), determining, at the BS, beamformers for known channels of the SRS, determining, at the BS, beamformers for unknown channels of the SRS based on the determined beamformers for the known channels, and selecting a modulation and coding scheme (MCS) based on the determined beamformers.

20 Claims, 5 Drawing Sheets

(51) Int. Cl.
*H04B 17/336* (2015.01)
*H04B 7/0413* (2017.01)

(56) References Cited

U.S. PATENT DOCUMENTS

| | | | |
|---|---|---|---|
| 2015/0124688 A1* | 5/2015 | Xu | H04L 27/2607 |
| | | | 370/312 |
| 2017/0324455 A1 | 11/2017 | Soriaga et al. | |
| 2018/0019795 A1 | 1/2018 | Zhang et al. | |
| 2019/0356364 A1* | 11/2019 | Maamari | H04L 5/0062 |

OTHER PUBLICATIONS

Bulusu, Saikiran et al., Rate Adaptation, Scheduling, and Mode Selection in D2D Systems with Partial Channel Knowledge, Copyright 2017 IEEE, pp. 13.

* cited by examiner

MODULATION AND CODING SCHEME SELECTION FOR MASSIVE MULTIPLE-INPUT MULTIPLE-OUTPUT (MIMO) SYSTEMS WITH PARTIAL CHANNEL INFORMATION

PRIORITY

This application is based on and claims priority under 35 U.S.C. § 119(e) to a U.S. Provisional Patent Application filed on Nov. 9, 2018 in the United States Patent and Trademark Office and assigned Ser. No. 62/758,204, the entire contents of which are incorporated herein by reference.

FIELD

The present disclosure relates generally multiple-input multiple-output (MIMO) communication systems. In particular, the present disclosure relates to a modulation and code scheme selection for massive MIMO systems with partial channel information.

BACKGROUND

A massive MIMO base station (BS) has a large number of transmit antennas and can provide fine resolution beamforming to serve user equipment (UE) with multiple antennas and/or to serve several numbers of UEs. In order to achieve the gain from the massive MIMO, the BS needs to design the transmitter (Tx) beamformers and select a modulation and coding scheme (MCS) associated to each codeword. This requires the downlink (DL) channel to be known at the BS. One possible method of providing the DL channel knowledge to the BS is through the transmission of a sounding reference signal (SRS) in uplink (UL) under the assumption of DL/UL channel reciprocity.

SUMMARY

According to one embodiment, a method is provided. The method includes receiving sounding reference signals (SRS) at a massive multiple-input multiple-output (MIMO) base station (BS) from a user equipment (UE), determining, at the BS, beamformers for known channels of the SRS, determining, at the BS, beamformers for unknown channels of the SRS based on the determined beamformers for the known channels, and selecting a modulation and coding scheme (MCS) based on the determined beamformers.

According to one embodiment, a system is provided. The system includes a UE and a massive MIMO BS. The UE is configured to transmit an SRS to the BS. The BS is configured to determine beamformers for known channels of the SRS, determine beamformers for unknown channels of the SRS based on the determined beamformers for the known channels, and select a modulation and coding scheme (MCS) based on the determined beamformers.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
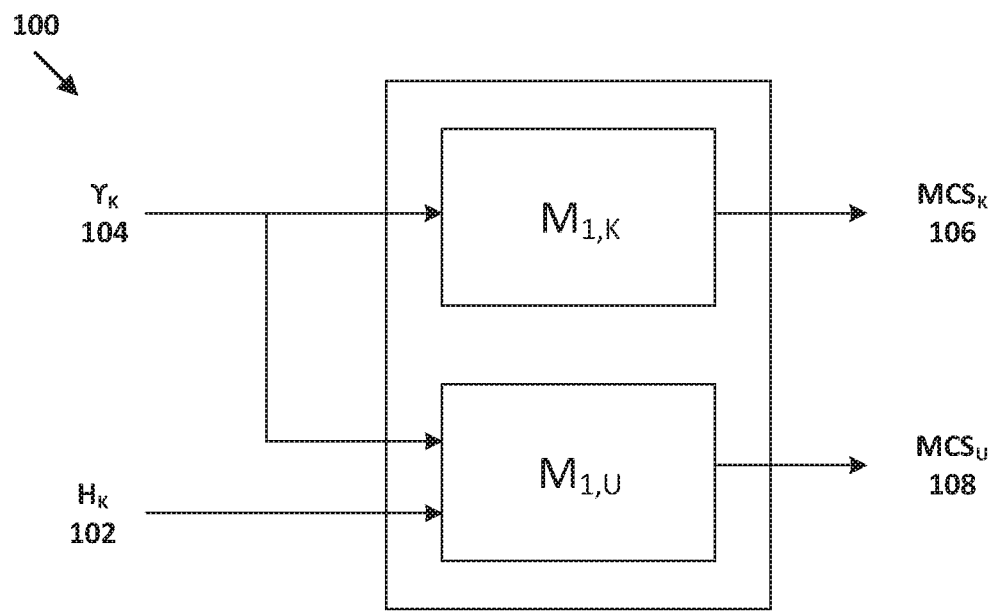
FIG. 1 is a diagram of a modulation and coding scheme selector, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The systems, methods and devices disclosed herein consider a scenario where the base station (BS) is only aware of partial channel information due to a sounding reference signal (SRS) reported on part of the uplink (UL) channel, addressing a problem related to modulation and coding scheme (MCS) selection in a massive MIMO setting when only partial channel information is available. Under massive MIMO conditions, the channel is assumed to be hardened so random orthogonal beamformers could be applied from a look-up table (LUT). The total transmission throughput may be improved by assigning the correct MCS through unknown beamforming directions.

Downlink (DL) channel information is required by a BS for beamforming design. This is typically enabled by UL SRS transmissions and assumption of UL/DL channel reciprocity. For a user equipment (UE) with multiple receiver (Rx) antennas, and in order to communicate the full channel information to the BS, multiple UL SRS transmissions are required (e.g., one SRS transmission per Rx antenna, which implies large overhead, particularly for a large number of Rx antennas). Addressed herein is the scenario where SRS is transmitted only through a subset of Rx antennas and thus only a part of the DL channel will be available to the BS for beamforming design.

The partial channel information problem is derived below. With $N_T \times N_R$ Rayleigh fading MIMO channel H over $N_L$ layer communications, the received signal among $N_L$ layers with beamforming can be written as Equation (1):

$$y = \begin{pmatrix} h_1^T \\ h_2^T \\ \vdots \\ h_{N_R}^T \end{pmatrix} (p_1 \quad p_2 \quad \cdots \quad p_{N_L}) \begin{pmatrix} x_1 \\ x_2 \\ \vdots \\ x_{N_L} \end{pmatrix} + n \quad (1)$$

Each channel $h_i$ is assumed to be of size $N_T \times 1$, having independent zero mean and unit variance Gaussian elements. L out of $N_L$ channels are known to the BS and the remaining $N_L - L$ channels are unknown. Without loss of generality the first L channels (e.g., $(h_1, h_2, \ldots, h_L)$, are assumed to be known to the BS. The known channels are defined by Equation (2):

$$H_K \stackrel{\text{def}}{=} \begin{pmatrix} h_1^T \\ h_2^T \\ \vdots \\ h_L^T \end{pmatrix} \quad (2)$$

The rest of the channels are unknown and defined by Equation (3):

$$H_U \stackrel{\text{def}}{=} \begin{pmatrix} h_{L+1}^T \\ h_{L+2}^T \\ \vdots \\ h_{N_R}^T \end{pmatrix} \quad (3)$$

Selection of MCSs associated to layers based on partial channel knowledge is of interest. The systems, methods, and devices described herein consider cases with a large number of transmit antennas.

Considering the scenario where the BS uses the partial channel information for beamforming design, the singular vectors of a known channel matrix $H_K$ from singular value decomposition (SVD) are used as beamformers for known channels and random beamformers, orthogonal to other beamformers, are used for unknown channels. The designed beamforming vectors are used to send the beamformed channel state information-reference signal (CSI-RS) to the UE to request channel quality indicator (CQI) feedback. The BS then uses the CQI feedback for MCS selection. The BS, to preserve CSI-RS, only transmits the beamformed CSI-RS for the known channel. Therefore, only CQI associated with the known beamformers will be fed back by UE.

FIG. 1 is a diagram of an MCS selector 100, according to an embodiment. Referring to FIG. 1, $H_K$ 102 is the known channel and $\gamma_K$ 104 is the receiver signal-to-noise ratio (SNR) of the layer(s) with known channel beamforming. The BS wants to select the MCS assigned to layers associated with both known channels $MCS_K$ 106 and unknown channels $MSC_U$ 108. The MCS selector 100 is based on CSI-RS preservation. The MCS selector 100 is described in further detail at FIG. 4.

In a scenario where the BS has partial channel information (e.g., due to partial SRS), and designs beamformers as described above (e.g., SVD of the known channels for up to the number of known channels and random orthogonal beamformers for the rest), the BS requests CQI from the UE by sending a single port CRS. Then, the BS estimates the UE's long term average noise power using the reported CQI by the UE and UE's features, and attempts to select MCSs for layers of both known and unknown channels.

Figure 2:
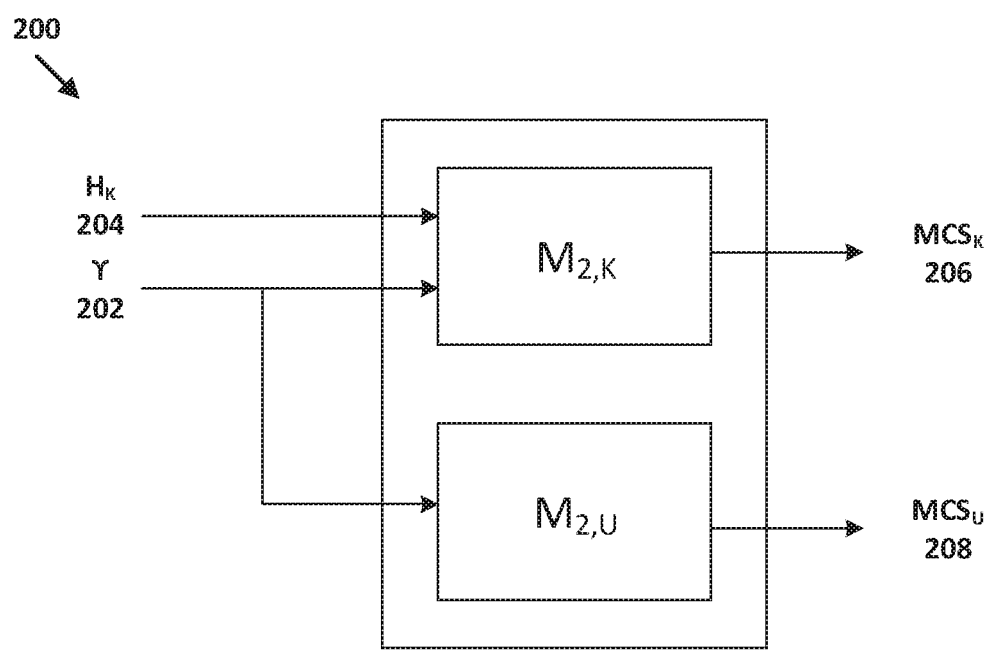
FIG. 2 is a diagram of a modulation and coding scheme selector, according to an embodiment.

FIG. 2 is a diagram of an MCS selector 200, according to an embodiment. Referring to FIG. 2, receiver inverse noise power γ 202 and the known channel $H_K$ 204 are known to the BS and MCS selector 200 selects layers associated with both known channels $MCS_K$ 206 and unknown channels $MSC_U$ 208. The MCS selector 200 is CQI based on a single port CRS. The MCS selector 200 is described in further detail at FIG. 5.

Described below is the case where L=1 channel, out of $N_R$=2 channels, which are known to the BS. Choosing a random beamformer for the unknown direction results in Equation (4):

$$\begin{bmatrix} y_1 \\ y_2 \end{bmatrix} = \frac{1}{\sqrt{2}} \begin{bmatrix} h_1^T \\ h_2^T \end{bmatrix} \begin{bmatrix} \frac{h_1^*}{|h_1|} & e^* \end{bmatrix} \begin{bmatrix} x_1 \\ x_2 \end{bmatrix} + \begin{bmatrix} n_1 \\ n_2 \end{bmatrix} \quad (4)$$

where $h_1^H e = 0$ and $|e|=1$. Next is Equation (5):

$$\begin{bmatrix} y_1 \\ y_2 \end{bmatrix} = \begin{bmatrix} |h_1| & 0 \\ \frac{h_2^T h_1^*}{|h_1|} & h_2^T e^* \end{bmatrix} \begin{bmatrix} x_1 \\ x_2 \end{bmatrix} + \begin{bmatrix} n_1 \\ n_2 \end{bmatrix} = \quad (5)$$

$$\frac{1}{\sqrt{2}} \begin{bmatrix} |h_1| & 0 \\ |h_2|\beta_{N_t} & |h_2|\alpha_{N_t} \end{bmatrix} \begin{bmatrix} x_1 \\ x_2 \end{bmatrix} + \begin{bmatrix} n_1 \\ n_2 \end{bmatrix}$$

Where $\alpha_{N_t}$, $\beta_{N_t}$ are the dot productions of independent unit vectors in $N_t$ dimensions. Letting $N_t$ becomes large, the channel hardening guarantees as shown in Equations (6) and (7):

$$\lim_{N_t \to \infty} E\{|h_j|\} = N_t \quad (6)$$

$$\lim_{N_t \to \infty} E\{(|h_j| - N_t)^2\} = 0 \quad (7)$$

Then as $N_t \to \infty$, the result is Equation 8:

$$\begin{bmatrix} y_1 \\ y_2 \end{bmatrix} \to \sqrt{\frac{N_t}{2}} \begin{bmatrix} 1 & 0 \\ \beta_{N_t} & \alpha_{N_t} \end{bmatrix} \begin{bmatrix} x_1 \\ x_2 \end{bmatrix} + \begin{bmatrix} n_1 \\ n_2 \end{bmatrix} \quad (8)$$

The first layer turns into a single input single output (SISO) additive white Gaussian noise (AWGN) (no fading) channel with SNR boost of $$10\log\left(\frac{N_t}{2}\right)$$

dB, such as Equation (9):

$$y_1 = \sqrt{\frac{N_t}{2}} x_1 + n_1 \quad (9)$$

The BS knows the achievable throughput of the SISO AWGN channel as a function of SNR for different MCSs. Thus, the BS knows the SISO AWGN SNR to MCS mapping, denoted as f(.). Considering the noise power per antenna is $\sigma_n^2$, and defining Equation (10):

$$\gamma = 10\log_{10}\left(\frac{1}{\sigma_n^2}\right), \quad (10)$$

the MCS of the first layer is selected as Equation (11):

$$M_1 = f\left(\gamma + 10\log\left(\frac{N_t}{2}\right)\right). \quad (11)$$

Assuming a successive interference cancellation (SIC) receiver, the interference of the first/strongest layer can be cancelled. The second/weakest layer becomes as Equation (12):

$$\tilde{y}_2 = \sqrt{\frac{N_t}{2}} \alpha_{N_t} x_2 + n_2 \quad (12)$$

The MCS of the second layer can be selected as Equation (13):

$$M_2 = f(\gamma + 10\log(\tfrac{1}{2}) - \epsilon_{1,1}(\gamma) - \gamma_{guard}), \quad (13)$$

where 3 dB SNR reduction is due to factor $$\frac{1}{\sqrt{2}}$$

for second layer and another $\epsilon_{1,1}(\gamma)$ is due to capacity difference of random beamformer with large Tx antennas and SISO AWGN channels. Also, $\gamma_{guard}$ is another design parameter that can be considered to be less than 2 dB.

The above example demonstrated a case for an SISO system. However, in a MIMO system, there will be known channels and unknown channels, and the present systems and methods provide MCS selection with determination of unknown channels.

Figure 3:
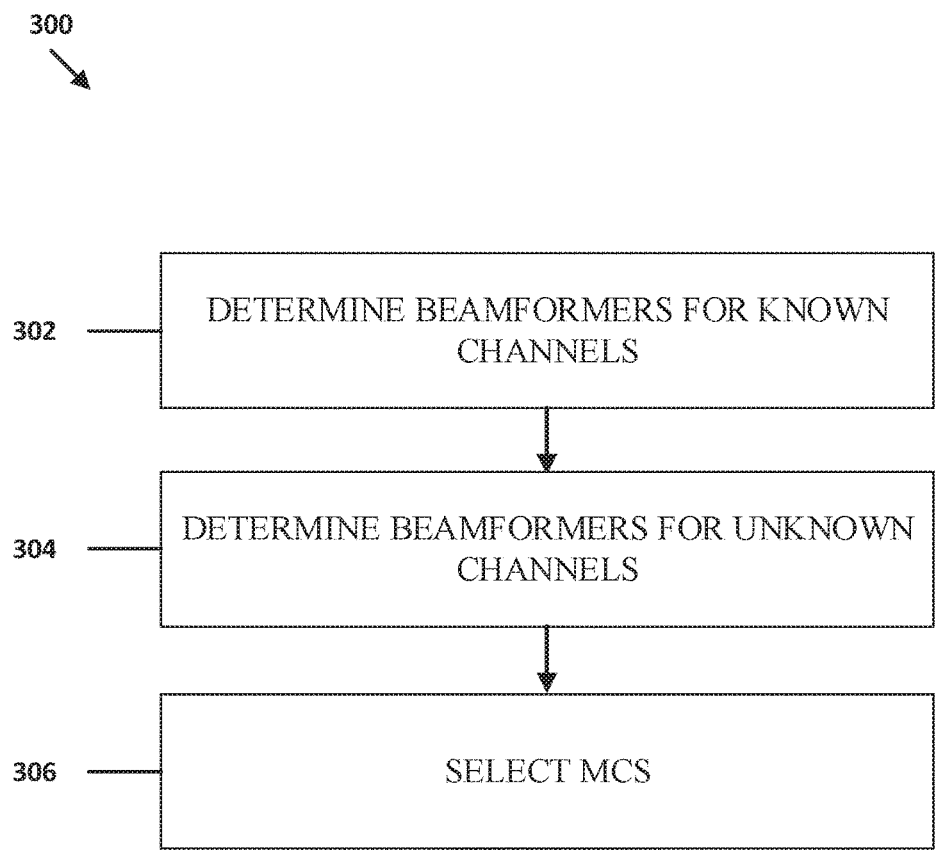
FIG. 3 is a flowchart for a method of MCS selection, according to an embodiment.

FIG. 3 is a flowchart 300 for a method of MCS selection, according to an embodiment. Referring to FIG. 3, at 302, beamformers are determined for known channels. For beamformer design, to determine the $N_L$ beamformers based on L known channels, singular value decomposition (SVD) of the known channels is applied as Equation (14):

$$H_K = U_K S_K V_K^H, \quad (14)$$

where subscript K stands for "known". The case where L, $N_L \le N_R \ll N_T$ is considered. The eigenvectors may be used as the beamformers as Equation (15):

$$(p_1 \quad p_2 \quad \cdots \quad p_{N_L}) = \frac{1}{\sqrt{N_L}} V_K(1:N_L), \quad (15)$$

where $V_K(1:N_L)$ denote the first $N_L$ columns of $N_T \times N_T$ matrix $V_K$. The $N_L$ eigenvectors are associated with the $N_L$ largest singular values of $H_K$. If $N_L \leq L$, all the layers are associated with a positive singular value. However, if $L < N_L$, only L out of $N_L$ layers observe non-zero singular values.

For known channels, using the eigenvectors $$P = \frac{1}{\sqrt{N_L}} V_K(1:L)$$

as beamformers of the first L layers, L parallel channels are generated. The signal powers of the parallel channels are determined by the square of singular values of $H_K$, i.e., the L non-zero diagonal elements of $S_K$, providing Equation (16):

$$H_K H_K^H = U_K S_K V_K^H V_K S_K^H U_K^H = U_K S_K S_K^H U_K^H = U_K \Sigma_K U_K^H \qquad (16)$$

Thus, the L non-zero singular values of $H_K$, are square root of L eigenvalues of Equation (17):

$$H_K H_K^H = \begin{pmatrix} h_1^T \\ h_2^T \\ \vdots \\ h_L^T \end{pmatrix} (h_1^* \ h_2^* \ \ldots \ h_L^*) = \begin{pmatrix} |h_1|^2 & h_1^T h_2^* & \ldots & h_1^T h_L^* \\ h_2^T h_1^* & |h_2|^2 & \ldots & h_2^T h_L^* \\ \vdots & \vdots & \ddots & \vdots \\ h_L^T h_1^* & h_L^T h_2^* & \ldots & |h_L|^2 \end{pmatrix} \qquad (17)$$

The BS can exactly calculate the eigenvalues of $H_K H_K^H$ and derive the SNRs of each parallel channel resulting from beamforming. In particular, knowing the fact that, by the definition of SVD, the columns of $V_K(1:N_L-L)$ are orthogonal to the columns of $V_K(1:L)$, L parallel channels are generated as Equation (18):

$$y_k = \frac{1}{\sqrt{N_L}} s_k x_k + n_k = \sqrt{\frac{e_k}{N_L}} x_k + n_k, k \in \{1, 2, \ldots, L\} \qquad (18)$$

Where $s_k$ and $e_k$ are the non-zero singular values of $H_K$ and eigenvalues of $H_K H_K^H$, respectively and $s_k = \sqrt{e_k}$. The factor $1/\sqrt{N_L}$ is the power normalization among all the $N_L$ beamformers. This information is sufficient for the BS to select the associated MCS.

Due to the fact that $N_T$ is very large, the variance of $e_k$ can be assumed to be very small and this allows treating the channels of the known directions as AWGN channels. In particular, when L is not very small, with high probability, Equation (19) is expected:

$$\left(1 - \sqrt{\frac{L}{N_T}}\right)^2 < \frac{e_k}{N_T} < \left(1 + \sqrt{\frac{L}{N_T}}\right)^2. \qquad (19)$$

Therefore, the condition $N_T \gg 1$, guarantees that $$\frac{e_k}{N_T} \to 1$$

for all k, and thus all the parallel channels' SNRs to be boosted by $$10 \log\left(\frac{N_T}{N_L}\right).$$

At 304, beamformers for unknown channels are determined. For unknown channels, the remaining $N_L - L$ beamformers (only if $N_L > L$) can be viewed as random orthogonal beamformers $p_k$ for $k \in \{L+1, \ldots, N_L\}$, $$|p_k|^2 = \frac{1}{N_L},$$

all being orthogonal to $p_j$ for $j \in \{1, \ldots, L\}$ from the known channels. With an SIC decoder, the symbols of the L strong channels from known directions can be successfully detected and the interference is cancelled out. The remaining channels result in Equation (20):

$$y_U = \begin{pmatrix} h_{L+1}^T \\ h_{L+2}^T \\ \vdots \\ h_{N_R}^T \end{pmatrix} (p_{L+1} \ p_{L+2} \ \ldots \ p_{N_L}) \begin{pmatrix} x_{L+1} \\ x_{L+2} \\ \vdots \\ x_{N_L} \end{pmatrix} + n_U = H_U P_U x_U + n_U \qquad (20)$$

where subscript U stands for "unknown". $H_U P_U$ can be written as Equation (21):

$$H_U P_U = \begin{pmatrix} \alpha_{N_T}(1,1) & \alpha_{N_T}(1,2) & \ldots & \alpha_{N_T}(1,L) \\ \alpha_{N_T}(2,1) & \alpha_{N_T}(2,2) & \ldots & \alpha_{N_T}(2,L) \\ \vdots & \vdots & \ddots & \vdots \\ \alpha_{N_T}(N_R-L,1) & \alpha_{N_T}(N_R-L,2) & \ldots & \alpha_{N_T}(N_R-L, N_L-L) \end{pmatrix} \qquad (21)$$

where $\alpha_{N_T}(i,j)$ are independent random variables, each being the inner product of two random vectors in $C^{N_T}$. The channel $H_U P_U$ is approximated with a $(N_R-L) \times (N_L-L)$ Rayleigh fading MIMO, and there are SNR correction factors $\epsilon_{(N_R-L),(N_L-L)}(\gamma)$ relating Rayleigh fading MCS to $(N_R-L)$ SISO AWGN channel. The gap function $\epsilon_{R_1,R_2}(\gamma)$ can be pre-calculated and stored as LUTs for different values of $R_1, R_2$. Different channel models may need different LUTs.

At 306, an MCS is selected. As described above, after beamforming, the L layers associated with the known channels, can be viewed as L parallel channels as Equation (22):

$$y_k = \sqrt{\frac{e_k}{N_L}} x_k + n_k, k \in \{1, 2, \ldots, L\}, \qquad (22)$$

where $e_k$ are the eigenvalues of $H_K H_K^H$, and $n_k \sim N(0, \sigma^2)$ with the noise powers $\sigma^2 = 10^{-0.1\gamma}$. Here, the operating SNR in dB scale is $\gamma$. In addition, by comparing the AWGN channel and the channels of $N_L - L$ layers associated with the unknown channel, the results channels are approximated as the following SISO AWGN channels with corrected SNR in Equation (23):

$$y_k = \frac{1}{\sqrt{N_L}} x_k + \tilde{n}_k, k \in \{L+1, \ldots, N_L\}, \quad (23)$$

where $\tilde{n}_k \sim N(0, \tilde{\sigma}^2)$ with the noise powers $$\tilde{\sigma}^2 = 10^{-0.1(\gamma + \epsilon_{(N_R-L),(N_L-L)}(\gamma))}.$$

If the MCS selection function of the SISO AWGN channel is indicated as f(.), then the MCS selection is as Equation (24):

$$MCS_k = \begin{cases} f\left(\gamma + 10\log\left(\frac{e_k}{N_L}\right)\right), & k \in \{1, \ldots, L\} \\ f\left(\gamma + 10\log\left(\frac{1}{N_L}\right) - \epsilon_{(N_R-L),(N_L-L)}(\gamma) - \gamma_{guard}\right), & k \in \{L+1, \ldots, N_L\} \end{cases} \quad (24)$$

$\gamma_{guard}$ is defined as the design parameter that can be considered to be less than 2 dB. Also, $\gamma_{k,K}$ is the receiver effective SNR experiences at layer k, resulting from beamforming based on the known channels.

Figure 4:
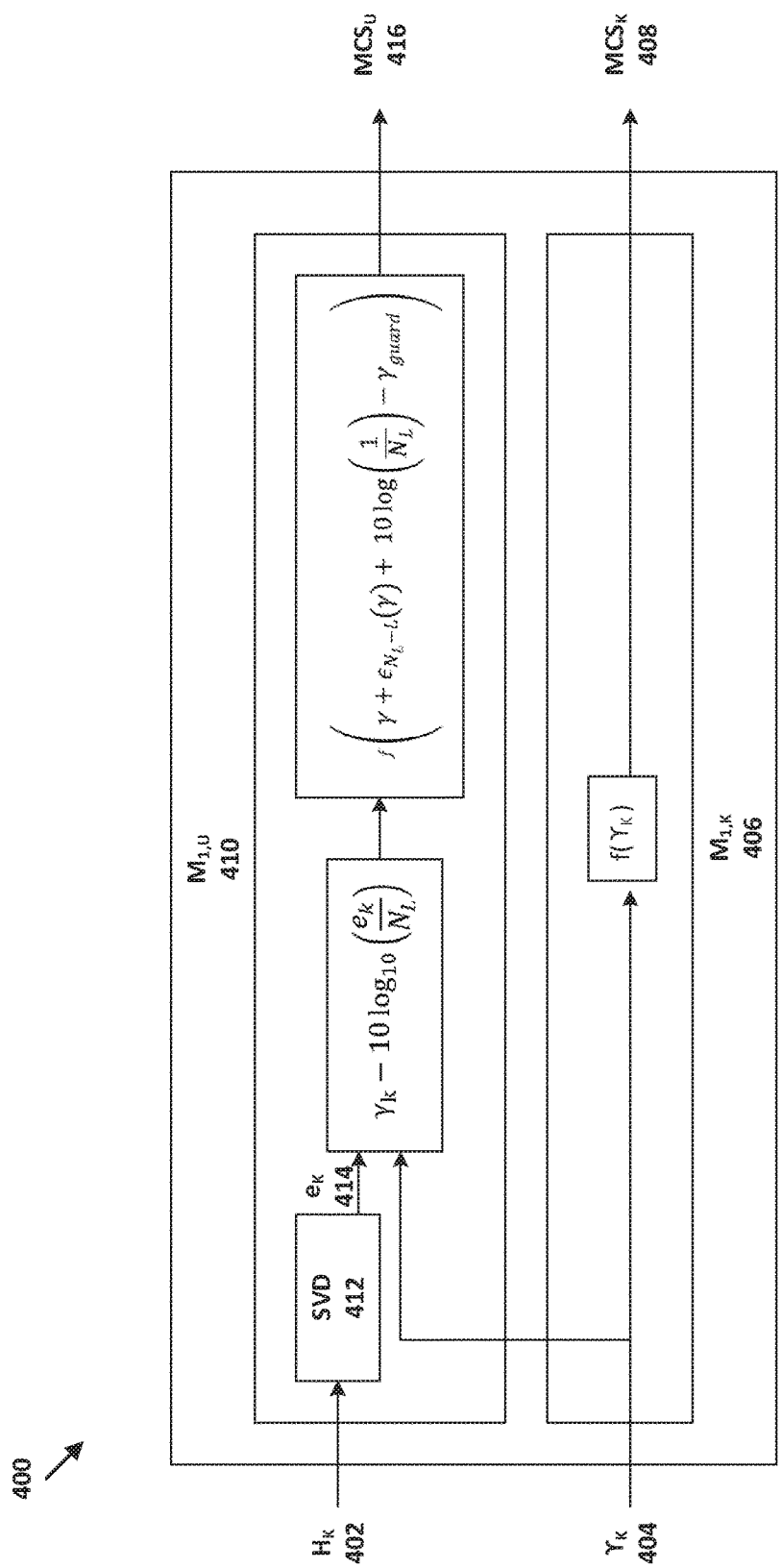
FIG. 4 is a diagram of a modulation and coding scheme selector, according to an embodiment.

FIG. 4 is a diagram of an MCS selector 400, according to an embodiment. As with the selector 100 of FIG. 1, the MCS selector 400 is based on CSI-RS preservation. $H_K$ 402 is the known channel and $\gamma_K$ 404 is the receiver SNR of the layer(s) with known channel beamforming. $\gamma_K$ 404 is transmitted through the known channel beamformer determination path 406 and the MCS 408 for known channels is selected. For the unknown channel beamformer determination path 410, both $H_K$ 402 and $\gamma_K$ 404 are transmitted to the path 410. An SVD 412 is applied to the $H_K$ 402 to obtain the eigenvalues $e_k$ 414 of $H_K$ 402. Then the MCS 416 for the unknown channels is selected.

Figure 5:
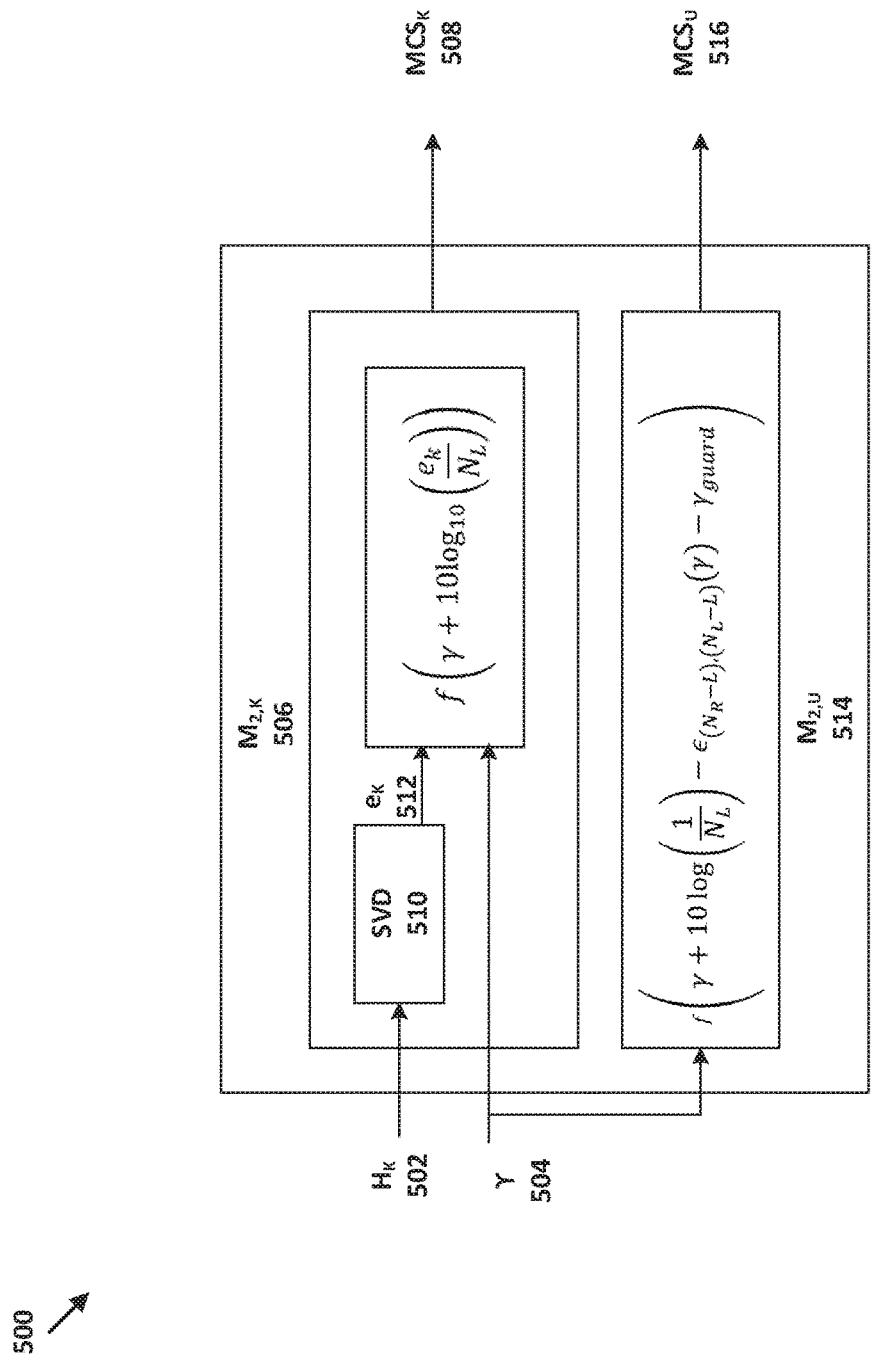
FIG. 5 is a diagram of a modulation and coding scheme selector, according to an embodiment.

FIG. 5 is a diagram of an MCS selector 500, according to an embodiment. As with the selector 200 of FIG. 2, the MCS selector 500 is CQI based on a single port CRS. $H_K$ 502 is the known channel and $\gamma$ 504 is the receiver SNR of the layer(s) with known channel beamforming. $H_K$ 502 and $\gamma$ 504 is transmitted through the known channel beamformer determination path 506 and the MCS 508 for known channels is selected. An SVD 510 is applied to the $H_K$ 502 to obtain the eigenvalues $e_k$ 512 of $H_K$ 502, and then the known channel MCS 508 are selected For the unknown channel beamformer determination path 514, $\gamma$ 504 are transmitted to the path 514, and an MCS 516 for unknown channels is selected.

Figure 6:
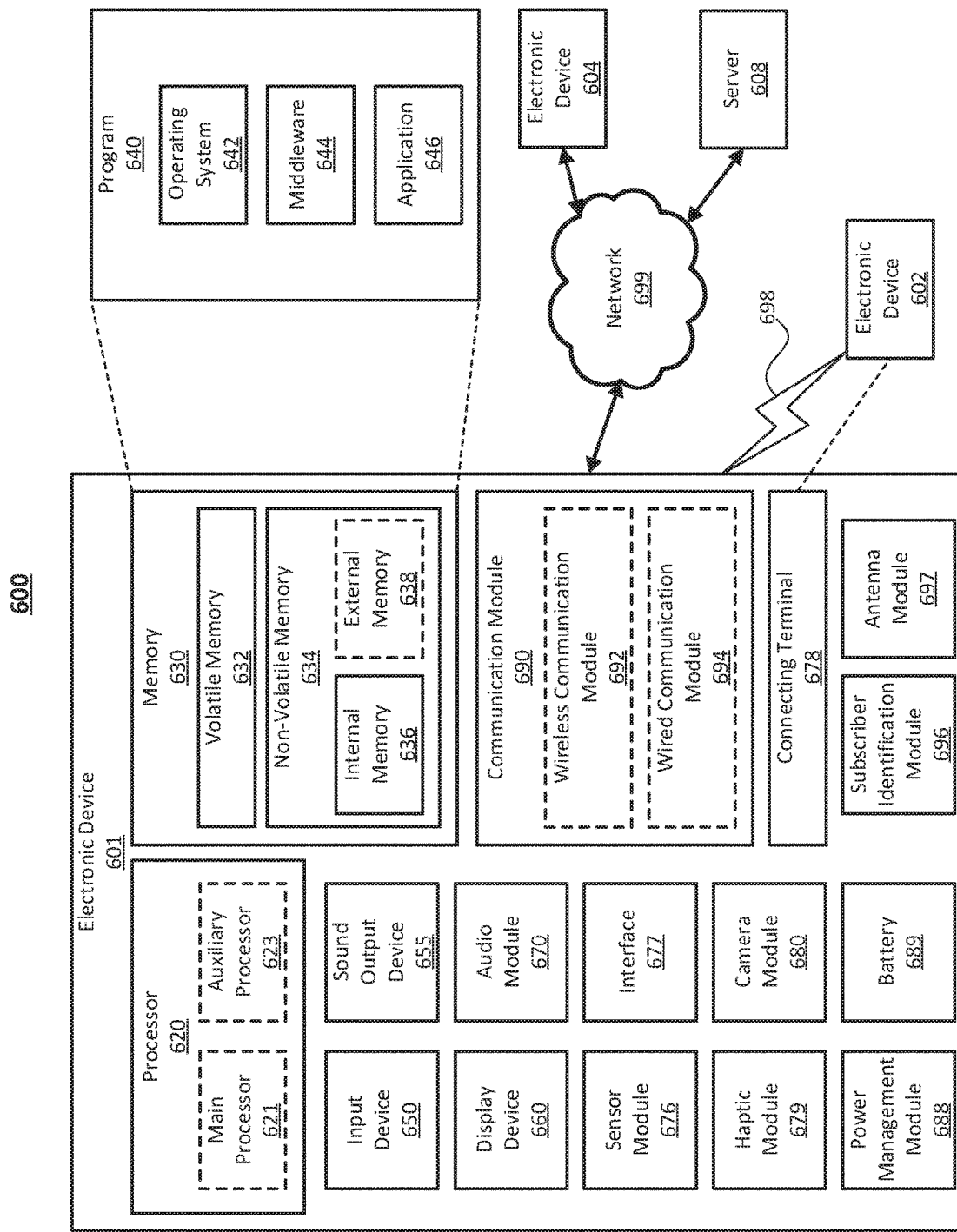
FIG. 6 is a block diagram of an electronic device in a network environment, according to one embodiment.

FIG. 6 is a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wiredly) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising
receiving sounding reference signals (SRS) at a massive multiple-input multiple-output (MIMO) base station (BS) from a user equipment (UE);
determining, at the BS, beamformers for known channels of the SRS;
determining, at the BS, beamformers for unknown channels of the SRS based on the determined beamformers for the known channels; and
selecting a modulation and coding scheme (MCS) the for unknown channels based on the determined beamformers for the known channels.

2. The method of claim 1, wherein the beamformers for the known channels and the unknown channels are determined using eigenvectors as $$\frac{1}{\sqrt{N_L}} V_K(1:L).$$

3. The method of claim 1, wherein determining beamformers for the known channels further comprises applying singular value decomposition (SVD) to the known channels.

4. The method of claim 1, wherein the MCS is selected based on a signal power of the SRS.

5. The method of claim 4, wherein the signal power is determined based on a channel quality index (CQI) received from the UE.

6. The method of claim 5, wherein the CQI is obtained based on a request from the BS using a single port cell-specific reference signal (CRS).

7. The method of claim 1, further comprising deriving signal to noise ratios (SNRs) of parallel channels within the known channels resulting from the beamformers for the known channels.

8. The method of claim 1, further comprising cancelling out interference in the unknown channels with a successive interference cancellation decoder.

9. The method of claim 1, wherein determining beamformers for the unknown channels further comprising utilizing random orthogonal beamformers for the unknown channels.

10. The method of claim 9, wherein the random orthogonal beamformers are orthogonal to the beamformers generated for the known channels.

11. A system, comprising:
a user equipment (UE); and
a massive multiple-input multiple-output (MIMO) base station (BS),
wherein the UE is configured to transmit sounding reference signals (SRS) to the BS, and
wherein the BS is configured to:
determine beamformers for known channels of the SRS;
determine beamformers for unknown channels of the SRS based on the determined beamformers for the known channels; and
select a modulation and coding scheme (MCS) for the unknown channels based on the determined beamformers for the known channels.

12. The system of claim 11, wherein the beamformers for the known channels and the unknown channels are determined using eigenvectors as $$\frac{1}{\sqrt{N_L}} V_K(1:L).$$

13. The system of claim 11, wherein the BS is configured to determine beamformers for the known channels by applying singular value decomposition (SVD) to the known channels.

14. The system of claim 11, wherein the MCS is selected based on a signal power of the SRS.

15. The system of claim 14, wherein the signal power is determined based on a channel quality index (CQI) received from the UE.

16. The system of claim 15, wherein the CQI is obtained based on a request from the BS using a single port cell-specific reference signal (CRS).

17. The system of claim 11, wherein the BS is further configured to derive signal to noise ratios (SNRs) of parallel channels within the known channels resulting from the beamformers for the known channels.

18. The system of claim 11, wherein the BS is further configured to cancel out interference in the unknown channels with a successive interference cancellation decoder.

19. The system of claim 11, wherein the BS is further configured to determine beamformers for the unknown channels by utilizing random orthogonal beamformers for the unknown channels.

20. The system of claim 19, wherein the random orthogonal beamformers are orthogonal to the beamformers generated for the known channels.

* * * * *